US011326959B2

(12) United States Patent
Nishikawa

(10) Patent No.: US 11,326,959 B2
(45) Date of Patent: May 10, 2022

(54) SENSOR DEVICE

(71) Applicant: TLV CO., LTD., Hyogo (JP)

(72) Inventor: Yoshihiro Nishikawa, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 280 days.

(21) Appl. No.: 16/655,614

(22) Filed: Oct. 17, 2019

(65) Prior Publication Data

US 2020/0049565 A1 Feb. 13, 2020

Related U.S. Application Data

(63) Continuation of application No. PCT/JP2017/016699, filed on Apr. 27, 2017.

(51) Int. Cl.
*G01K 1/08* (2021.01)
*G01L 19/00* (2006.01)

(52) U.S. Cl.
CPC ............ *G01K 1/08* (2013.01); *G01L 19/0092* (2013.01)

(58) Field of Classification Search
CPC .............................. G01L 19/0092; G01K 1/08
USPC ........................................................ 73/714
See application file for complete search history.

(56) References Cited

U.S. PATENT DOCUMENTS

| 4,244,212 | A * | 1/1981 | Stignani .................... G01F 1/40 |
| | | | 73/112.01 |
| 7,690,262 | B2 * | 4/2010 | Nakabayashi ...... G01L 19/0092 |
| | | | 73/708 |
| 8,417,084 | B2 * | 4/2013 | Stoesz ................. G01L 19/0092 |
| | | | 385/137 |
| 9,658,125 | B2 * | 5/2017 | Gilbert ............... A61B 5/14735 |
| 2004/0101025 | A1 | 5/2004 | Welker |

FOREIGN PATENT DOCUMENTS

| JP | S59-128539 U | 8/1984 |
| JP | H09-297067 A | 11/1997 |
| JP | 6110047 B1 | 4/2017 |
| WO | 2015/105102 A1 | 7/2015 |

OTHER PUBLICATIONS

International Search Report issued in PCT/JP2017/016699; dated Aug. 1, 2017.

* cited by examiner

*Primary Examiner* — Nathaniel T Woodward
(74) *Attorney, Agent, or Firm* — Studebaker & Brackett PC

(57) ABSTRACT

A sensor device includes: a rod member including an axially extending gas passage into which fluid flows; a sheath pipe thinner than the gas passage, inserted in the gas passage with a distal end thereof being located inside the gas passage, and configured to detect a temperature of the fluid; an insert configured to fix a proximal end of the sheath pipe; and retention members configured to retain the distal end of the sheath pipe.

5 Claims, 2 Drawing Sheets

SENSOR DEVICE

CROSS-REFERENCE TO RELATED APPLICATION

This is a continuation of PCT International Application PCT/JP2017/016699 filed on Apr. 27, 2017. The disclosure of this application including the specification, the drawings, and the claims is hereby incorporated by reference in its entirety.

FIELD

The present application relates to a sensor device for detecting a temperature of fluid.

BACKGROUND

A sensor device that is attached to a pipe where fluid flows and detects a temperature of the fluid is known as described in WO2015/105102A1, for example. In this sensor device, a temperature sensor (sheath pipe) is inserted in a cylindrical member whose inner peripheral surface has a helical groove, and a helical passage for fluid is formed by the helical groove and the temperature sensor. In this sensor device, fluid flows upward in the helical passage. A pressure of the fluid is detected by the pressure sensor disposed in an upper portion of the sensor device, and a temperature of the fluid is detected by a temperature sensor. While fluid is flowing in the helical passage, the fluid exchanges heat with the outside so that the temperature of the fluid decreases. Accordingly, low-temperature fluid flows in the pressure sensor, and thus, a temperature sensor capable of withstanding high temperatures is not needed. As a result, costs for the pressure sensor can be reduced.

SUMMARY

In a case where the pipe to which the sensor device described above is attached has a large pipe diameter, the cylindrical member needs to be long in order to obtain a length sufficient for inserting the cylindrical member in the pipe. On the other hand, the helical passage only needs to have a length sufficient for reducing the fluid temperature to a predetermined temperature. Thus, in consideration of a high processing cost for the helical groove, the length of the helical passage is restricted to a minimum length. In this case, the distal end of the sheath pipe in the cylindrical member is a free end so that the sheath pipe is susceptible to the influence of a fluid pressure.

The technique disclosed in the present application has been made in view of the foregoing circumstances, and an object thereof is to reduce the influence of a fluid pressure on a temperature sensor while reducing costs.

The technique disclosed in the present application relates to a sensor device including a rod member, a temperature sensor, a fixing member, and a retention member. An axially extending fluid passage is formed inside the rod member and configured such that fluid flows into the fluid passage. The temperature sensor has a rod shape and is thinner than the fluid passage. The temperature sensor is inserted in the fluid passage with a distal end of the temperature sensor located in the fluid passage, and is configured to detect a temperature of the fluid. The fixing member is configured to fix a proximal end of the temperature sensor. The retention member is disposed in the rod member and configured to retain the distal end of the temperature sensor.

A sensor device according to the present application can reduce the influence of a fluid pressure on a temperature sensor.

DESCRIPTION OF EMBODIMENTS

An embodiment of the present application will be described with reference to the drawings. The following embodiment is merely a preferred example in nature, and is not intended to limit techniques disclosed in this application, applications, and use of the application.

A sensor device 1 according to this embodiment is attached to a pipe in which fluid flows in, for example, a plant, and detects (measures) two parameters, that is, a temperature and a pressure, of the fluid. In description of this embodiment, fluid as a detection target (measurement target) is steam.

Figure 1:
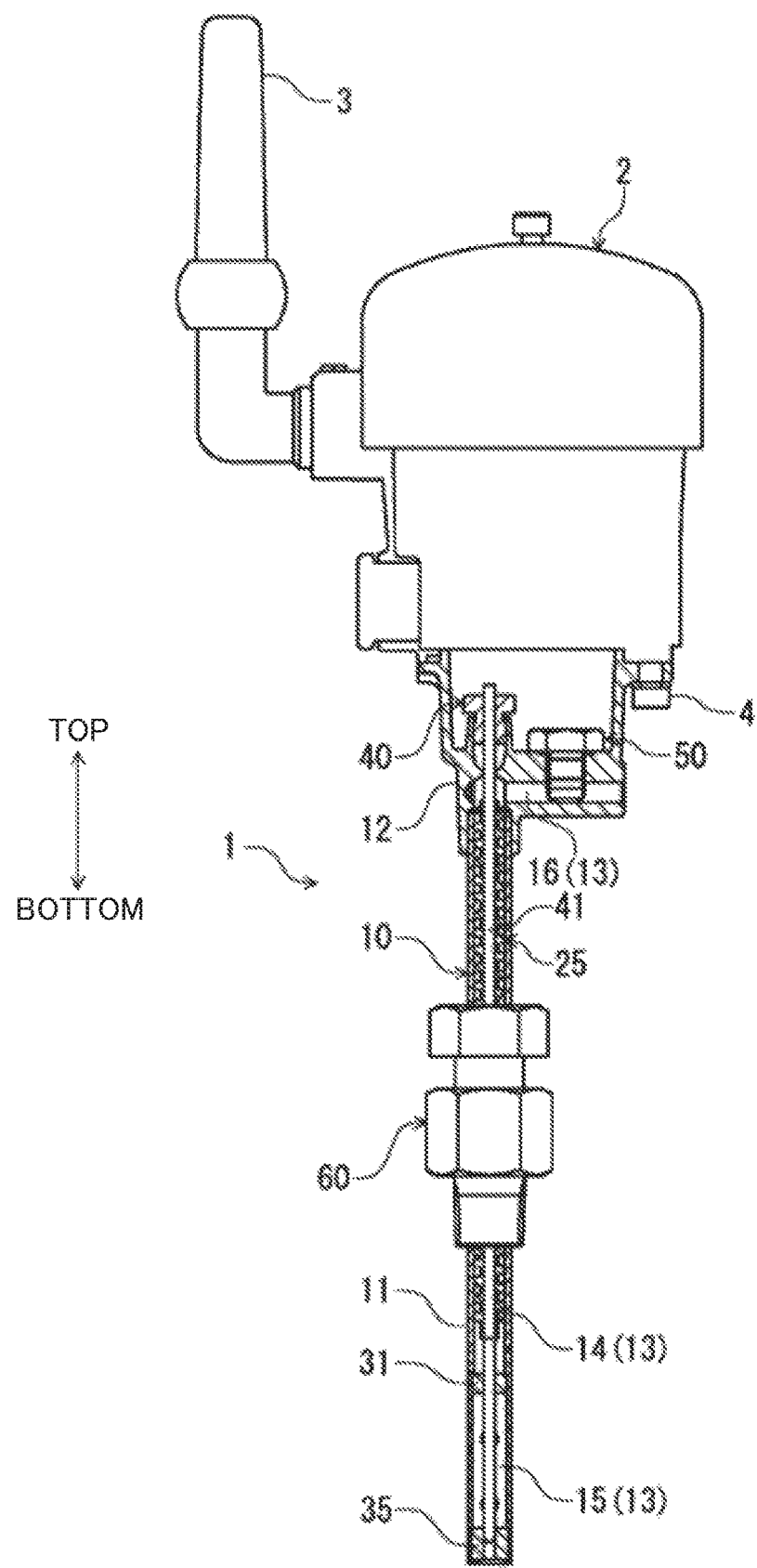
FIG. 1 is a cross-sectional view illustrating a schematic configuration of a sensor device according to an embodiment.

As illustrated in FIG. 1, the sensor device 1 of this embodiment is provided with a wireless communication device 2 including an antenna for communication. The sensor device 1 includes a body 10, a temperature sensor 40 (thermocouple), a pressure sensor 50, and an attachment member 60.

Figure 2:
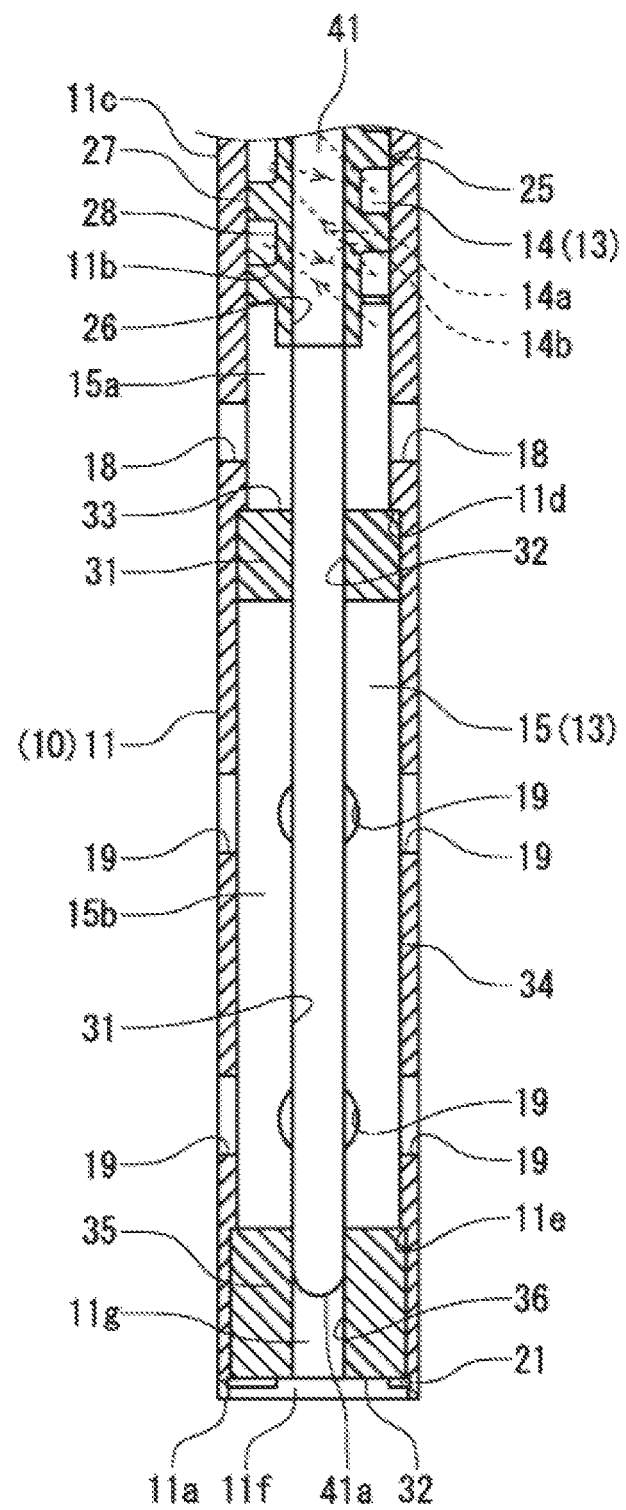
FIG. 2 is a cross-sectional view illustrating a main portion of the sensor device according to the embodiment in an enlarged manner.

As also illustrated in FIG. 2, a gas passage 13 into which steam as a detection target flows is formed inside the body 10. The gas passage 13 constitutes a fluid passage recited in claims of the present application. Specifically, the body 10 includes a rod portion 11 and a head portion 12. The rod portion 11 has a cylindrical shape extending vertically (in directions indicated by arrows in FIG. 1), and corresponds to a rod member recited in claims of the present application. The rod portion 11 is connected to the head portion 12 such that the head portion 12 is fitted in an end (upper end) of the rod portion 11. The head portion 12 has a substantially L shape in front view.

The gas passage 13 includes a helical passage 14 (helically shaped passage), a linear passage 15, and a lateral passage 16. The helical passage 14 and the linear passage 15 are formed in the rod portion 11, and the lateral passage 16 is formed in the head portion 12. The gas passage 13 is open (has an opening) in a lower end surface 11a (axial end surface) of the rod portion 11, and extends in the axial direction inside the rod portion 11. The helical passage 14 is formed in substantially an upper half portion of the rod portion 11. One end of the helical passage 14 communicates with the lateral passage 16, and the other end of the helical passage 14 communicates with the linear passage 15. The helical passage 14 is formed inside the rod portion 11 and extends in the axial direction (vertically). The linear passage 15 is located near the lower end of the rod portion 11, and is continuous to the upstream side of the helical passage 14. That is, the linear passage 15 communicates with the helical passage 14 at one end, and the other end of the linear passage 15 communicates with the opening of the lower end surface 11a.

The helical passage 14 will be specifically described. The rod portion 11 has a tubular inner peripheral surface 11b, and an insert 25 having a rod shape (specifically, a cylindrical shape) is inserted in the rod portion 11. The insert 25 is shorter than the rod portion 11, and is located in substantially an upper half of the rod portion 11. The insert 25 has an outer peripheral surface 27 with a helical groove 28 (groove having a helical pattern). The helical groove 28 extends in the axial direction (vertically) on the outer peripheral surface 27 of the insert 25, and extends across the entire length of the insert 25. The helical groove 28 of this embodiment is rectangular in a vertical cross section. The vertical cross section here refers to a cross section of the helical groove 28 taken in parallel with the axial direction (longitudinal direction) thereof. The outer diameter of the insert 25 is substantially equal to the inner diameter of the rod portion 11. That is, the insert 25 is inserted in the rod portion 11 with the outer peripheral surface 27 being in contact with the inner peripheral surface 11b of the rod portion 11. In the rod portion 11, the inner peripheral surface 11b and the helical groove 28 of the insert 25 form the helical passage 14 described above. That is, in the sensor device 1 of this embodiment, the insert 25 is inserted in the rod portion 11 of the body 10 to form the helical passage 14 together with the inner peripheral surface 11b of the rod portion 11.

As indicated by broken lines in FIG. 2, the helical passage 14 of this embodiment includes descending portions 14b that tilt downward in an intermediate portion of the helical passage 14. Specifically, the helical passage 14 includes ascending portions 14a and the descending portions 14b that are arranged alternately. The ascending portions 14a tilt upward toward a location in communication with the pressure sensor 50 (i.e., lateral passage 16) described later. The descending portions 14b tilt downward toward the location in communication with the pressure sensor 50. That is, in the insert 25, the helical groove 28 is formed such that the ascending portions 14a and the descending portions 14b are alternately arranged. The structure of the helical groove 28 is not limited to this example. The helical groove 28 may be constituted only by ascending portions without descending portions.

The head portion 12 is provided with the temperature sensor 40 and the pressure sensor 50. The temperature sensor 40 includes a sheath pipe 41 in which a thermocouple or a resistance temperature detector for detecting a temperature of steam in the linear passage 15 (i.e., in the gas passage 13). The sheath pipe 41 has a slender tubular shape (rod shape), and is inserted in the gas passage 13 of the rod portion 11. Specifically, the sheath pipe 41 is engaged in clearance fit fashion with the insert 25 with the proximal end of the sheath pipe 41 inserted in the through hole 26 of the insert 25. Specifically, the proximal end of the sheath pipe 41 is fixed (retained) by the insert 25. That is, the insert 25 constitutes a fixing member that fixes the proximal end of the sheath pipe 41.

The sheath pipe 41 is inserted in the gas passage 13 with a distal end 41a being located in the linear passage 15 (gas passage 13). The pressure sensor 50 is disposed in the head portion 12 while communicating with the lateral passage 16, and is configured to detect a pressure of steam in the lateral passage 16 (i.e., in the gas passage 13). That is, in the gas passage 13, the helical passage 14 is disposed upstream of the location in communication with the pressure sensor 50. The sheath pipe 41 is thinner than the linear passage 15 (gas passage 13). The linear passage 15 has an annular shape by inserting the sheath pipe 41 of the rod portion 11. The gas passage 13 is configured such that steam flows from the distal end toward the proximal end of the sheath pipe 41.

In the sensor device 1, the head portion 12 is fastened and fixed to a lower portion of the communication device 2. In the sensor device 1, signals concerning a temperature and a pressure detected by the temperature sensor 40 and the pressure sensor 50 are sent to the communication device 2 through electric wires (not shown). In the communication device 2, signals sent from, for example, the temperature sensor 40 are processed and sent to external equipment through the antenna 3.

The rod portion 11 of the body 10 is provided with the attachment member 60 for attaching the sensor device 1 to a pipe. The sensor device 1 is fixed to the pipe by the attachment member 60 with the lower end of the rod portion 11 inserted in the pipe. At this time, the sensor device 1 is fixed with the rod portion 11 extending vertically. The attachment member 60 is configured such that the length of insertion of the rod portion 11 in the pipe is adjustable. In the thus-fixed sensor device 1, a lower end portion of the rod portion 11, that is, a portion of the rod portion 11 in which the linear passage 15 is provided is exposed to steam in the pipe.

The sensor device 1 of this embodiment also includes a retention member that is disposed in the rod portion 11 and retains the distal end of the sheath pipe 41 (temperature sensor 40). In this embodiment, as retention members, two members of a downstream retention member 31 and an upstream retention member 35 are provided. Each of the downstream retention member 31 and the upstream retention member 35 is made of a metal, and disposed in the linear passage 15 of the rod portion 11.

The upstream retention member 35 has a cylindrical shape, and is inserted in an opening in the lower end surface 11a. The outer diameter of the upstream retention member 35 is substantially equal to the inner diameter of the rod portion 11, and is inserted in the opening of the lower end surface 11a with the outer peripheral surface being in contact with the inner peripheral surface 11b corresponding to the linear passage 15 in the rod portion 11. In the upstream retention member 35, the distal end 41a of the sheath pipe 41 is inserted in a through hole 36 to be engaged with the through hole 36. In this manner, the upstream retention member 35 retains the distal end 41a of the sheath pipe 41, and closes the opening of the lower end surface 11a.

The upstream retention member 35 is inserted in the rod portion 11 to contact a step 11e formed on the inner peripheral surface 11b of the rod portion 11. That is, the step 11e restricts an insertion position of the upstream retention member 35. The upstream retention member 35 is disposed in a state where the lower end surface thereof is located inward of the lower end surface 11a of the rod portion 11. That is, the lower end of the rod portion 11 has a space 11f corresponding to the inward shift of the lower end surface of the upstream retention member 35. The distal end 41a of the sheath pipe 41 is inserted in the through hole 36 of the upstream retention member 35 to a halfway position of the through hole 36. Thus, a space 11g communicating with the outside is formed in the through hole 36 of the upstream retention member 35. These spaces 11f and 11g allow steam flowing in the pipe to easily flow to the distal end 41a of the sheath pipe 41. In the rod portion 11, a stopper 21 disposed below the upstream retention member 35 prevents outward removal of the upstream retention member 35.

The downstream retention member 31 has a cylindrical shape, and is inserted in the rod portion 11. The downstream retention member 31 is located downstream of the upstream retention member 35 in the rod portion 11, and at a halfway position in the linear passage 15. The outer diameter of the downstream retention member 31 is substantially equal to the inner diameter of the rod portion 11. The downstream retention member 31 is inserted in the rod portion 11 with the outer surface of the downstream retention member 31 being in contact with the inner peripheral surface 11b of the rod portion 11 corresponding to the linear passage 15. The downstream retention member 31 has an axial length larger than that of the upstream retention member 35.

A portion of the downstream retention member 31 closer to the proximal end than the distal end 41a of the sheath pipe 41 is inserted and fitted in the through hole 32. In this manner, the downstream retention member 31 retains a portion of the sheath pipe 41 closer to the proximal end than the distal end 41a of the sheath pipe 41 (distal end portion), and blocks the linear passage 15. That is, the linear passage 15 is divided by the downstream retention member 31 into a downstream passage 15a and an upstream passage 15b. The downstream passage 15a and the upstream passage 15b do not communicate with each other. The downstream retention member 31 is inserted in the rod portion 11 to contact a step 11d formed on the inner peripheral surface 11b of the rod portion 11. That is, the step 11d restricts an insertion position of the downstream retention member 31. The downstream passage 15a is shorter than the upstream passage 15b.

Communication holes 18 into which stream can flow are formed in a side position of the rod portion 11 corresponding to the downstream passage 15a, that is, a side position corresponding to the linear passage 15 downstream of the downstream retention member 31. The communication holes 18 penetrate the rod portion 11 from the outer peripheral surface 11c to the inner peripheral surface 11b, and allow the downstream passage 15a to communicate with the outside. The plurality of communication holes 18 are arranged along the circumference of the rod portion 11. Communication holes 19 into which stream can flow are formed in a side position of the rod portion 11 corresponding to the upstream passage 15b, that is, a side position corresponding to the linear passage 15 between the downstream retention member 31 and the upstream retention member 35. The communication holes 19 penetrate the rod portion 11 from the outer peripheral surface 11c to the inner peripheral surface 11b, and allow the downstream passage 15a to communicate with the outside. The plurality of communication holes 19 are arranged along the circumference of the rod portion 11.

In the sensor device 1, steam in the pipe flows into the spaces 11f and 11g, and a temperature of the steam is detected by the distal end 41a of the sheath pipe 41. Steam in the pipe flows into the upstream passage 15b from the communication holes 19 and remains therein. At this time, the sheath pipe 41 also detects the temperature of steam. Steam in the pipe flows into the downstream passage 15a from the communication holes 18, passes through the helical passage 14, and then flows in the lateral passage 16. A pressure of steam flowing in the lateral passage 16 is detected by the pressure sensor 50.

As described above, the sensor device 1 of the embodiment includes the insert 25 (fixing member) for fixing the proximal end of the sheath pipe 41, and the retention member (downstream retention member 31 and upstream retention member 35) provided in the rod portion 11 and configured to retain the distal end portion of the sheath pipe 41. Accordingly, the influence of a steam pressure (fluid pressure) on the sheath pipe 41 can be reduced.

The sensor device 1 of the embodiment also includes the helical passage 14 disposed upstream of a location in communication with the pressure sensor 50 in the gas passage 13. Thus, the area over which contact is made with steam in the rod portion 11 can be increased as compared to, for example, a linear passage, and thus, heat transfer between steam and the rod portion 11 (body 10) can be promoted. Accordingly, even if the steam has a high temperature in the pipe, it is possible to reduce the temperature of the steam near the pressure sensor 50 where the steam has passed through the helical passage 14. That is, the steam exchanges heat with the rod portion 11 to have its temperature gradually decrease in the gas passage 13, an increase in contact area between the steam and the rod portion 11 can increase the degree of temperature decrease of the steam. Then, even if a detection target is high-temperature steam, the pressure sensor 50 designed to operate at a temperature lower than the temperature of the steam can be used. Thus, a pressure sensor capable of withstanding high temperatures does not need to be used anymore, thus enabling reduction of costs for the sensor device 1.

As described above, in the sensor device 1 that detects not only a steam temperature but also a steam pressure, the rod portion 11 is long in order to form the helical passage 14, and the sheath pipe 41 is long accordingly. Although this structure facilitates vibrations of the distal end portion of the sheath pipe 41, such vibrations can be reduced by the retention member (the downstream retention member 31 and the upstream retention member 35).

The sensor device 1 of the embodiment also includes the insert 25 having a cylindrical shape whose outer peripheral surface has the helical groove 28. The insert 25 is inserted in the rod portion 11, and the helical passage 14 is formed by the helical groove 28 and the inner peripheral surface 11b of the rod portion 11. Accordingly, the helical passage 14 can be easily formed inside the rod portion 11. The insert 25 also serves as a fixing member in which the proximal end of the sheath pipe 41 is inserted and fixed. Thus, no additional fixing member is needed.

In the sensor device 1 of the embodiment, the downstream retention member 31 blocks the linear passage 15 continuous to the upstream side of the helical passage 14. Thus, the downstream retention member 31 can prevent drain generated by condensation of steam in the helical passage 14 from flowing upstream in the linear passage 15. Thus, it is possible to prevent low-temperature drain from contacting the distal end portion as a detection portion of the sheath pipe 41. Accordingly, the sheath pipe 41 can accurately detect the temperature of steam.

In addition, the communication holes 18 into which steam can flow are disposed in a side portion of the rod portion 11 corresponding to the downstream passage 15a downstream of the downstream retention member 31. This configuration enables steam to flow into the helical passage 14 from the outside while the linear passage 15 being blocked by the downstream retention member 31 so that the pressure of steam can be detected. In addition, it is also possible to cause drain having flowed down from the helical passage 14 and accumulated in the downstream passage 15a to flow to the outside through the communication holes 18.

The sensor device 1 of the embodiment includes, as the retention members, the upstream retention member 35 for retaining the distal end 41a of the sheath pipe 41 and the downstream retention member 31 for retaining a portion of the sheath pipe 41 extending from the distal end 41a toward the proximal end. Thus, vibrations of the sheath pipe 41 caused by steam can be further reduced.

The upstream retention member 35 has a cylindrical shape which is inserted in the opening of the lower end surface 11a of the rod portion 11 and in which the distal end 41a of the sheath pipe 41 is inserted. This configuration enables steam to contact the distal end 41a of the sheath pipe 41 while retaining the distal end 41a of the sheath pipe 41.

In addition, the communication holes 19 into which steam can flow are disposed in a side portion of the rod portion 11 corresponding to the upstream passage 15b between the downstream retention member 31 and the upstream retention member 35. This configuration enables steam to flow into the upstream passage 15b from the outside. Accordingly, it is possible to cause steam to contact the distal end of the of the sheath pipe 41 that is the detection portion so that the temperature of steam can be more accurately detected.

The sensor device 1 of the embodiment includes the descending portions 14b in a halfway position of the sheath pipe 41. This configuration allows drain water generated by steam condensation in the helical passage 14 or in the lateral passage 16 to remain in a position continuous from the descending portions 14b to the ascending portions 14a. Drain water generated by steam condensation in the helical passage 14 is allowed to remain in a halfway portion of the helical passage 14. In this manner, the interposition of drain water as liquid in a halfway portion of the helical passage 14 can reduce transfer of an outside high-temperature gas to the pressure sensor 50 through the gas passage 13. That is, the interposition of liquid (drain water), which has a heat transfer coefficient lower than that of a gas (steam), in a part of the gas passage 13 can hinder heat transfer in the gas passage 13. Accordingly, the pressure sensor 50 designed to operate at low temperatures can be used, and thus, costs for the sensor device 1 can be further reduced.

The technique disclosed in the present application may have the following configurations in the embodiment.

For example, in the sensor device 1 of the embodiment, only one of the downstream retention member 31 and the upstream retention member 35 may be provided.

In the sensor device 1 of the embodiment, the downstream retention member 31 blocks the linear passage 15. Alternatively, the downstream retention member 31 may be configured such that the downstream passage 15a and the upstream passage 15b communicate with each other. For example, the outer peripheral surface of the downstream retention member 31 may have a slit through which the downstream retention member 31 and the upstream retention member 35 communicate with each other.

In the sensor device 1 of the embodiment, the upstream retention member 35 blocks the opening of the lower end surface 11a of the rod portion 11. Alternatively, the upstream retention member 35 may be configured such that the upstream passage 15b can communicate with the outside. For example, the upstream retention member 35 may include a communication hole through which the upstream passage 15b can communicate with the outside.

In the sensor device 1 of the embodiment, the insert 25 is a fixing member. Alternatively, the insert 25 may be omitted, and another member may be used for fixing the proximal end of the sheath pipe 41.

In the foregoing description, the detection target of the sensor device 1 of the embodiment is steam. Alternatively, the detection target may be liquid or a gas except for steam.

The technique disclosed in the present application is useful for a sensor device including a temperature sensor for detecting a temperature of fluid.

What is claimed is:

1. A sensor device comprising:
a rod member including an axially extending fluid passage, the fluid passage being formed inside the rod member and configured such that fluid flows into the fluid passage;
a temperature sensor having a rod shape and thinner than the fluid passage, the temperature sensor being inserted in the fluid passage with a distal end of the temperature sensor being located inside the fluid passage, the temperature sensor being configured to detect a temperature of the fluid;
a fixing member configured to fix a proximal end of the temperature sensor;
a retention member disposed in the rod member and configured to retain the distal end of the temperature sensor;
a pressure sensor communicating with the fluid passage, the pressure sensor being configured to detect a pressure of the fluid, wherein
the fluid passage is configured such that the fluid flows from the distal end of the temperature sensor toward the proximal end of the temperature sensor,
the fluid passage includes
a helically shaped passage disposed upstream of a location in communication with the pressure sensor, and
a linear passage continuous to an upstream side of the helically shaped passage;
the retention member is disposed in the linear passage to block the linear passage; and
a first communication hole into which the fluid is allowed to flow is disposed in a side portion of the rod member corresponding to the linear passage downstream of the retention member, wherein the first communication hole penetrates the rod member from the outer peripheral surface to the inner peripheral surface.

2. The sensor device according to claim 1, wherein
the rod member has a cylindrical shape in which the fluid passage is defined,
the sensor device further comprises an insert having a cylindrical shape whose outer peripheral surface has an helically shaped groove, the insert being configured to be inserted in the rod member so that the helically shaped passage is defined by an inner peripheral surface of the rod member and the helically shaped groove, and
the proximal end of the temperature sensor is inserted in the insert so that the insert constitutes the fixing member.

3. The sensor device according to claim 1, wherein
the retention member includes an upstream retention member that retains the distal end of the temperature sensor and a downstream retention member that retains a portion of the temperature sensor closer to the proximal end than the distal end and blocks the linear passage.

4. The sensor device according to claim 3, wherein
the upstream retention member has a cylindrical shape which is inserted in an opening at an axial end of the rod member and in which the distal end of the temperature sensor is inserted, and
the upstream retention member closes the opening.

5. The sensor device according to claim 4, wherein
a second communication hole into which the fluid is allowed to flow is disposed in a side portion of the rod member corresponding to the linear passage between the upstream retention member and the downstream retention member, and
the second communication hole penetrates the rod member from the outer peripheral surface to the inner peripheral surface.

* * * * *